United States Patent
Maxfield et al.

(10) Patent No.: US 9,973,486 B2
(45) Date of Patent: May 15, 2018

(54) SYSTEMS AND METHODS FOR AUTHORIZING A SESSION BETWEEN A BROWSER AND A TERMINAL SERVER

(71) Applicant: Lenovo Enterprise Solutions (Singapore) Pte. Ltd., New Tech Park (SG)

(72) Inventors: Brandon Moyes Maxfield, Cary, NC (US); Matthew William Fardig, Wake Forest, NC (US); Gregory Lee Walls, Wake Forest, NC (US); Richard German, Morrisville, NC (US)

(73) Assignee: LENOVO ENTERPRISE SOLUTIONS (SINGAPORE) PTE. LTD., New Tech Park (SG)

( * ) Notice: Subject to any disclaimer, the term of this patent is extended or adjusted under 35 U.S.C. 154(b) by 0 days. days.

(21) Appl. No.: 14/852,500

(22) Filed: Sep. 12, 2015

(65) Prior Publication Data
US 2017/0078258 A1    Mar. 16, 2017

(51) Int. Cl.
*H04L 29/06*    (2006.01)
*H04L 29/08*    (2006.01)

(52) U.S. Cl.
CPC ............ *H04L 63/08* (2013.01); *H04L 63/061* (2013.01); *H04L 67/02* (2013.01); *H04L 67/141* (2013.01)

(58) Field of Classification Search
CPC . H04L 63/08; H04L 63/0807; H04L 63/0815; H04L 61/2007; H04L 67/141; H04L 67/146; H04L 67/02; H04L 63/061
See application file for complete search history.

(56) References Cited

U.S. PATENT DOCUMENTS

| | | | | |
|---|---|---|---|---|
| 8,255,984 B1* | 8/2012 | Ghostine | ................ | G06F 21/41 |
| | | | | 709/217 |
| 2014/0380426 A1* | 12/2014 | Lin | ........................ | G06F 21/31 |
| | | | | 726/4 |
| 2015/0341383 A1* | 11/2015 | Reddy | ................ | H04L 63/0245 |
| | | | | 726/22 |

OTHER PUBLICATIONS

"Central Authentication Server," Wikipedia, dated Sep. 9, 2015.

* cited by examiner

*Primary Examiner* — Joseph P Hirl
*Assistant Examiner* — Chi Nguy
(74) *Attorney, Agent, or Firm* — Olive Law Group, PLLC

(57) ABSTRACT

Systems and methods for authorizing a session between a browser and a terminal server are disclosed. According to an aspect, a method includes receiving, from a browser, a request to initiate a session with a terminal server. The method also includes storing identification of the terminal server and session information. The method includes associating a claim identifier with the stored identification and session information. The method further includes communicating the claim identifier browser. The method also includes receiving the claim identifier from a terminal server. The method also includes using the claim identifier received from the terminal server to verify that the terminal server is authorized to initiate the session with the browser. The method further includes in response to verifying that the terminal server is authorized to initiate the session with browser, notifying the terminal server of authorization to initiate the session with browser.

17 Claims, 9 Drawing Sheets

SYSTEMS AND METHODS FOR AUTHORIZING A SESSION BETWEEN A BROWSER AND A TERMINAL SERVER

TECHNICAL FIELD

The presently disclosed subject matter relates to browser sessions. More specifically, the presently disclosed subject matter relates to authorization of sessions between browsers and terminal servers.

BACKGROUND

Terminal services are components of an operating system (OS) (e.g., the MICROSOFT WINDOWS® OS available from Microsoft Corporation) that allow a user to take control of a remote computer or virtual machine over a network connection. For example, terminal services provide the ability to host multiple, simultaneous client sessions on WINDOWS® operating systems. Terminal services are capable of directly hosting compatible, multi-user client desktops running on a variety of WINDOWS®-based and non-WINDOWS®-based computers. Standard WINDOWS®-based applications generally do not need modification to run in terminal services. In this manner, corporations can take advantage of the choice of applications and tools offered by the OS environment. Organizations may use terminal services to deliver WINDOWS®-based applications to heterogeneous desktop environments, over local area network (LAN), wide area network (WAN), and dial-up connections. This is a cost-effective way to deploy applications that are frequently updated, hard to install, or need to be accessed over low-bandwidth connections.

When a terminal server session is launched via a browser, the terminal server session is launched after the user has authenticated to a central authentication service (CAS) system. For example, the terminal server session might launch to a computer that is situated inside of a network, thus requiring authentication or verification before allowing the user into the system. Once the terminal server session is established, if the user would like to utilize any services on the CAS, then authentication to that CAS must be performed again. Known solutions may include sharing data between two terminal sessions. However, such solutions require additional server code and still require a user to authenticate twice with the CAS system. Other known solutions may include passing the terminal server session information into the terminal server as an application parameter. Unfortunately, such a method may enable the terminal session information to easily be intercepted and utilized by someone other than the authenticated user.

Terminal server sessions require processing via a CAS and the computing devices and/or servers upon which they are executing. Some types of applications executing within the terminal server sessions may further add to the processing requirements of the underlying computing device (e.g., computers and/or servers). For example, applications that may have high data traffic requirements may include media rich content, audio/video streaming or applications that require drawings. These applications can be demanding on the CAS's resources due to the general computing processing requirements of such applications.

In view of the foregoing, there is a need for improved techniques for managing terminal server sessions.

SUMMARY

Disclosed are systems and methods for transferring terminal session information to terminal servers and browsers to terminal servers and browsers on those terminal servers. According to an aspect, a method includes receiving, from a browser of a second computing device, a request to initiate a session with a terminal server. The method also includes storing identification of the terminal server and session information. The method includes associating a claim identifier with the stored identification and session information. The method further includes communicating the claim identifier to the second computing device. The method also includes receiving the claim identifier from a terminal server. The method also includes using the claim identifier received from the terminal server to verify that the terminal server is authorized to initiate the session with the browser. The method further includes notifying the terminal server of authorization to initiate the session with browser in response to verifying that the terminal server is authorized to initiate the session with browser.

BRIEF DESCRIPTION OF THE DRAWINGS

The illustrated embodiments of the disclosed subject matter will be best understood by reference to the drawings, wherein like parts are designated by like numerals throughout. The following description is intended only by way of example, and simply illustrates certain selected embodiments of devices, systems, and processes that are consistent with the disclosed subject matter as claimed herein.

DETAILED DESCRIPTION

Figure 1:
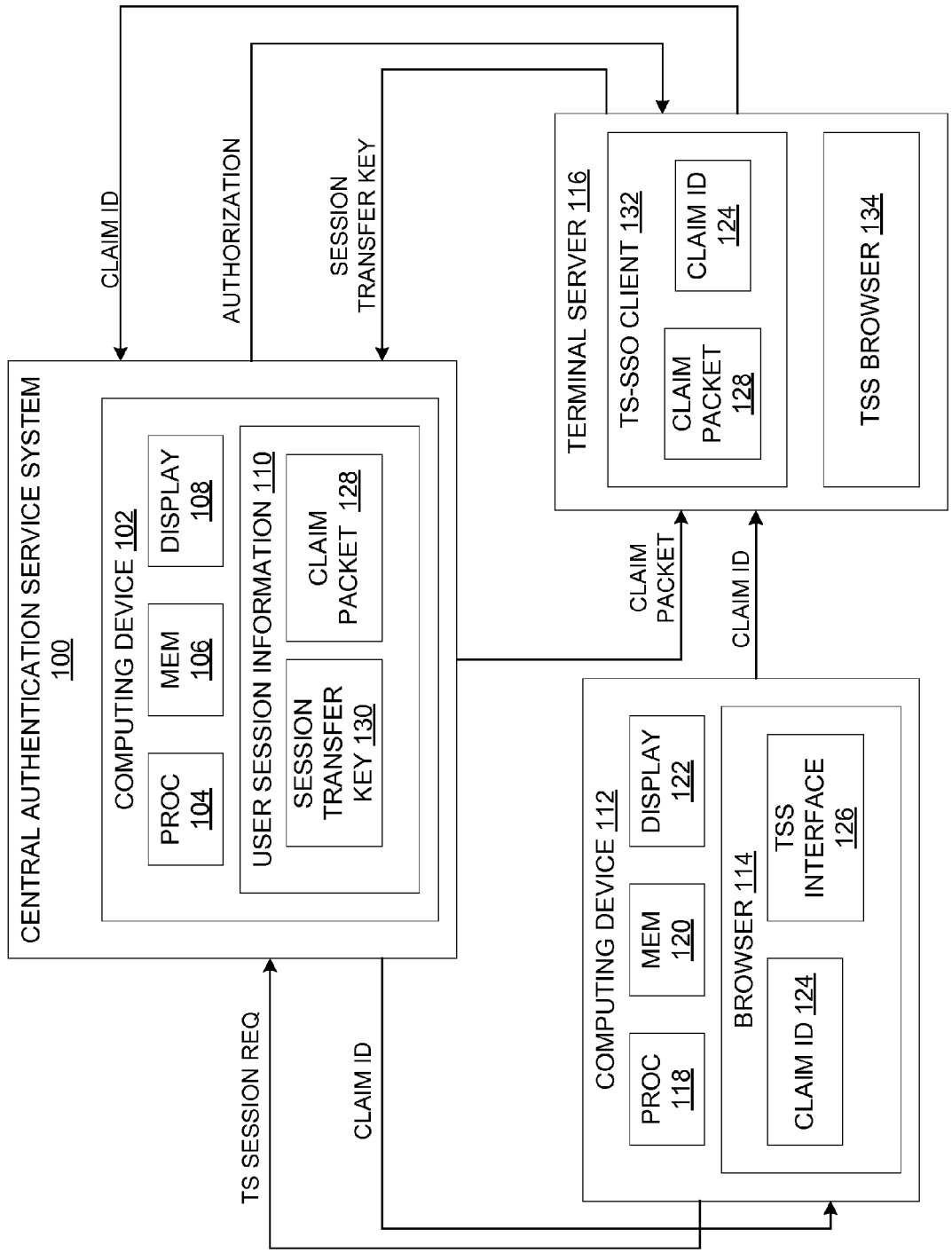
FIG. 1 is a system diagram of an example system for authorizing a session between a browser and a terminal server in accordance with embodiments of the present disclosure.

The following detailed description is made with reference to the figures. Exemplary embodiments are described to illustrate the disclosure, not to limit its scope, which is defined by the claims. Those of ordinary skill in the art will recognize a number of equivalent variations in the description that follows.

The functional units described in this specification have been labeled as devices. A device may be implemented in programmable hardware devices such as processors, digital signal processors, central processing units, field programmable gate arrays, programmable array logic, programmable logic devices, cloud processing systems, or the like. The devices may also be implemented in software for execution by various types of processors. An identified device (e.g., a computing device) may include executable code and may, for instance, comprise one or more physical or logical blocks of computer instructions, which may, for instance, be organized as an object, procedure, function, or other construct. Nevertheless, the executables of an identified device need not be physically located together, but may comprise disparate instructions stored in different locations which, when joined logically together, comprise the device and achieve the stated purpose of the device.

An executable code of a device may be a single instruction, or many instructions, and may even be distributed over several different code segments, among different applications, and across several memory devices. Similarly, operational data may be identified and illustrated herein within the device, and may be embodied in any suitable form and organized within any suitable type of data structure. The operational data may be collected as a single data set, or may be distributed over different locations including over different storage devices, and may exist, at least partially, as electronic signals on a system or network.

The described features, structures, or characteristics may be combined in any suitable manner in one or more embodiments. In the following description, numerous specific details are provided, to provide a thorough understanding of embodiments of the disclosed subject matter. One skilled in the relevant art will recognize, however, that the disclosed subject matter can be practiced without one or more of the specific details, or with other methods, components, materials, etc. In other instances, well-known structures, materials, or operations are not shown or described in detail to avoid obscuring aspects of the disclosed subject matter.

As referred to herein, the term "computing device" should be broadly construed. It can include any type of device including hardware, software, firmware, the like, and combinations thereof. A computing device may include one or more processors and memory or other suitable non-transitory, computer readable storage medium having computer readable program code for implementing methods in accordance with embodiments of the present disclosure. A computing device may be a mobile computing device such as, for example, but not limited to, a smart phone, a cell phone, a pager, a personal digital assistant (PDA), a mobile computer with a smart phone client, or the like. A computing device can also include any type of conventional computer, for example, a laptop computer or a tablet computer. A typical mobile computing device is a wireless data access-enabled device (e.g., an iPHONE® smart phone, a BLACKBERRY® smart phone, a NEXUS ONE™ smart phone, an iPAD® device, or the like) that is capable of sending and receiving data in a wireless manner using protocols like the Internet Protocol, or IP, and the wireless application protocol, or WAP. This allows users to access information via wireless devices, such as smart phones, mobile phones, pagers, two-way radios, communicators, and the like. Wireless data access is supported by many wireless networks, including, but not limited to, CDPD, CDMA, GSM, PDC, PHS, TDMA, FLEX, ReFLEX, iDEN, TETRA, DECT, DataTAC, Mobitex, EDGE and other 2G, 3G, 4G and LTE technologies, and it operates with many handheld device operating systems, such as PalmOS, EPOC, Windows CE, FLEXOS, OS/9, JavaOS, iOS and Android. Typically, these devices use graphical displays and can access the Internet (or other communications network) on so-called mini- or micro-browsers, which are web browsers with small file sizes that can accommodate the reduced memory constraints of wireless networks. In a representative embodiment, the mobile device is a cellular telephone or smart phone that operates over GPRS (General Packet Radio Services), which is a data technology for GSM networks. In addition to a conventional voice communication, a given mobile device can communicate with another such device via many different types of message transfer techniques, including SMS (short message service), enhanced SMS (EMS), multi-media message (MMS), email WAP, paging, or other known or later-developed wireless data formats. Although many of the examples provided herein are implemented on smart phone, the examples may similarly be implemented on any suitable computing device, such as a computer.

As referred to herein, the term "user interface" is generally a system by which users interact with a computing device. A user interface can include an input for allowing users to manipulate a computing device, and can include an output for allowing the computing device to present information and/or data, indicate the effects of the user's manipulation, etc. An example of a user interface on a computing device includes a graphical user interface (GUI) that allows users to interact with programs or applications in more ways than typing. A GUI typically can offer display objects, and visual indicators, as opposed to text-based interfaces, typed command labels or text navigation to represent information and actions available to a user. For example, a user interface can be a display window or display object, which is selectable by a user of a computing device for interaction. In another example, the user can use any other suitable user interface of a computing device, such as a keypad, to select the display icon or display object. For example, the user can use a track ball or arrow keys for moving a cursor to highlight and select the display object.

As used herein, the term "memory" is generally a storage device of a computing device. Examples include, but are not limited to, ROM and RAM. The device or system for performing one or more operations on a memory of a computing device may be a software, hardware, firmware, or combination of these. The device or the system is further intended to include or otherwise cover all software or computer programs capable of performing the various heretofore-disclosed determinations, calculations, or the like for the disclosed purposes. For example, exemplary embodiments are intended to cover all software or computer programs capable of enabling processors to implement the disclosed processes. Exemplary embodiments are also intended to cover any and all currently known, related art or later developed non-transitory recording or storage mediums (such as a CD-ROM, DVD-ROM, hard drive, RAM, ROM, floppy disc, magnetic tape cassette, etc.) that record or store such software or computer programs. Exemplary embodiments are further intended to cover such software, computer programs, systems and/or processes provided through any other currently known, related art, or later developed medium (such as transitory mediums, carrier waves, etc.), usable for implementing the exemplary operations disclosed below.

In accordance with the exemplary embodiments, the disclosed computer programs can be executed in many exemplary ways, such as an application that is resident in the memory of a device or as a hosted application that is being executed on a server and communicating with the device application or browser via a number of standard protocols, such as TCP/IP, HTTP, XML, SOAP, REST, JSON and other sufficient protocols. The disclosed computer programs can be written in exemplary programming languages that execute from memory on the device or from a hosted server, such as BASIC, COBOL, C, C++, Java, Pascal, or scripting languages such as JavaScript, Python, Ruby, PHP, Perl, or other suitable programming languages.

The present disclosure is now described in more detail. For example, FIG. 1 illustrates block diagram of an example system for authorizing a session between a browser and a terminal server in accordance with embodiments of the present disclosure. As shown in FIG. 1, the system may comprise a central authentication service (CAS) system 100 comprising at least one computing device 102. In embodiments, the computing device 102 may be a server, or the like. FIG. 1 also illustrates that computing device 102 of the CAS system 100 may comprise a processor 104, memory 106, and a display 108 in order to perform the methods of the present disclosure as discussed herein below.

In accordance with embodiments of the present disclosure, the CAS system 100 may be configured to provide a single sign-on protocol for the Internet or remote application access. For example, the CAS system 100 may be configured to permit a user of computing device 112 to access multiple applications accessible via computing device 102. In this example, the CAS system 100 may store a user's credentials (e.g., user ID and password) once as user session information 110 for a terminal server session. Also in this example, such user credentials may have been received from a browser 114 of the computing device 112 requesting a terminal server session with terminal server 116. Also shown in FIG. 1, computing device 102 may include a processor 118, memory 120, and display 122 in order to perform the methods of the present disclosure discussed herein below.

In accordance with embodiments, the CAS system 100 may be configured to allow web-based applications accessible via computing device 102 to authenticate a user of computing device 112 without gaining access to the user's security credentials, such as, but not limited to, a password. For example, the CAS system 100 may comprise software and/or hardware applications that implements such protocols, such as LENOVO™ STONEWARE®'s WEBNETWORK™.

Figure 2:
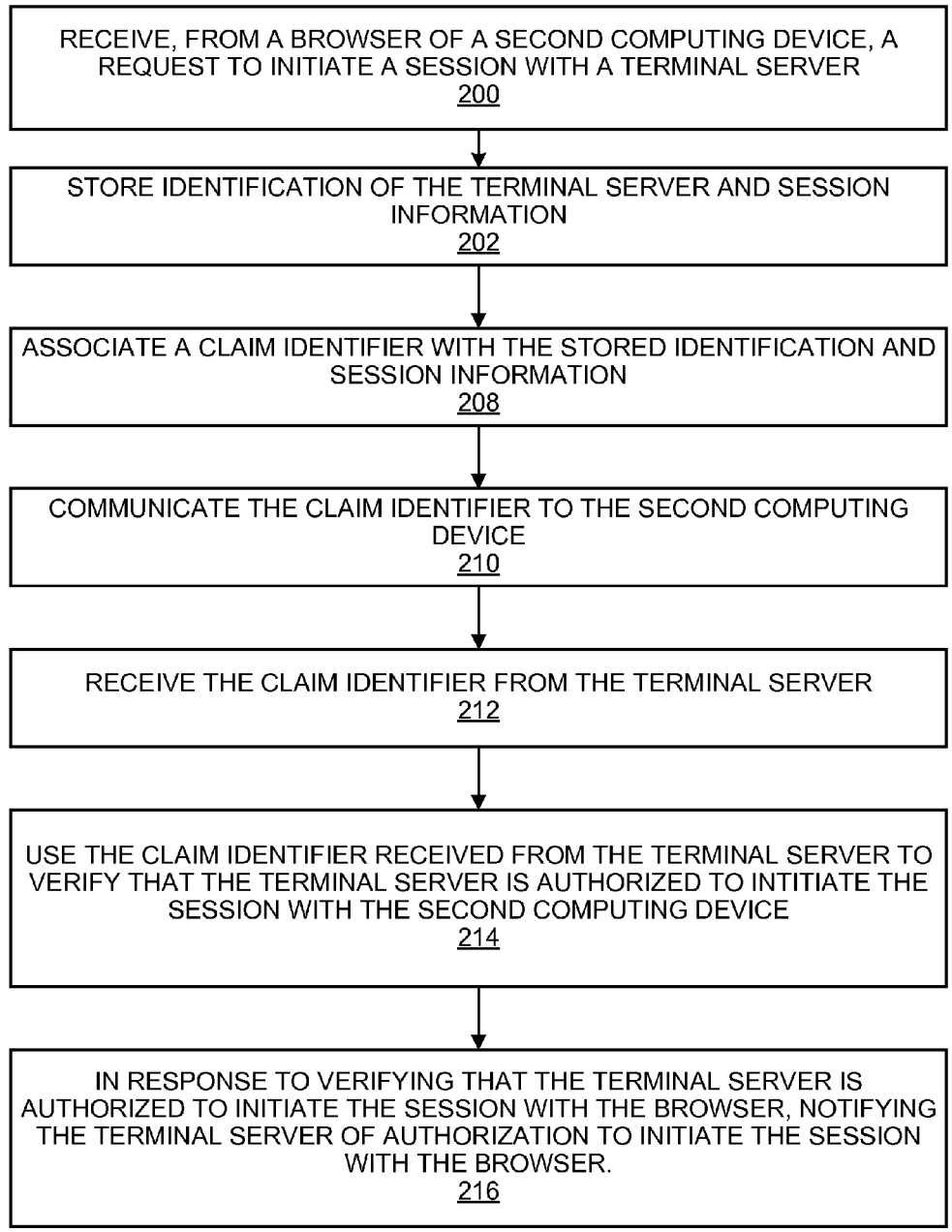
FIG. 2 is a flow chart of an example method for authorizing a session between a browser and a terminal server in accordance with embodiments of the present disclosure.

FIG. 2 illustrates an example method for authorizing a session between a browser and a terminal server in accordance with embodiments of the present disclosure. In accordance with embodiments, the method may be performed by a first computing device configured to perform the embodiments of the present disclosure. For example, the first computing device may comprise the CAS system 100 of FIG. 1. Returning to FIG. 2, the method may include receiving 200, from a browser of a second computing device, a request to initiate a session with a terminal server. For example, FIG. 1 illustrates that the CAS system 100 may receive a TS SESSION REQ from browser 114 of computing device 102.

The method of FIG. 2 includes storing 202 identification of the terminal server and session information. For example, the CAS system 100 may configured to store the identification of the terminal server 116 and session information identified in the TS SESSION REQ with user session information 110. In accordance with embodiments, the user session information 110 may comprise a browser type of browser 114, computing devices hosting applications accessible to computing device 112, internet protocol (IP) addresses of the corresponding computing devices, terminal server session browsers to be initiated, software versions, and the like. In one embodiment, the session information may comprise an Internet Protocol (IP) address of the terminal server and identification of session launch information.

As shown in FIG. 2, the method may include associating 208 a claim identifier with the stored identification and session information. For example, the CAS system 100 may be configured to associate a claim identifier with the stored identification of the terminal server 116 and session information. In accordance with embodiments, the CAS system 100 may be configured to randomly generate a number or value for the claim identifier. Other methods for generating or acquiring the claim identifier may be utilized by the CAS system 100 comprising, but not limited to, pre-assignment from a claim identifier database. In accordance with embodiments, the claim identifier may be stored in a claim packet associated with the session information. For example, the claim identifier may be stored in claim packet 128 of user session information 110. Further example description regarding claim packet 128 is provided herein below regarding with respect to FIG. 4.

Returning to FIG. 2, the method may include communicating the claim identifier to the second computing device. For example, FIG. 1 illustrates the CAS system 100 may be configured to communicate the claim identifier 124 to computing device 112. In accordance with embodiments, the method may include encrypting the claim identifier and communicating the encrypted claim identifier to the second computing device. For example, the CAS system 100 may be configured to encrypt the claim identifier 124 and communicate the encrypted claim identifier 124 to computing device 112. In one embodiment, the encryption of the claim identifier is performed using a shared key. In this embodiment, the shared key is known also to the terminal server 116. In another embodiment, the claim identifier may be encrypted using is a symmetric-key scheme, where the encryption and decryption keys are the same. In another embodiment, the claim identifier may be encrypted using a public-key encryption scheme. In this encryption, scheme only the terminal server 116 may have access to the decryption key.

The method of FIG. 2 includes receiving 212 the claim identifier from the terminal server. For example, the CAS system 100 may receive the claim identifier 124 from terminal server 116. The method also includes using 214 the claim identifier received from the terminal server to verify that the terminal server is authorized to initiate the session with the second computing device. For example, the CAS system 100 may use the claim identifier 124 received from the terminal server 116 to verify that the terminal server 116 is authorized to initiate the session with computing device 102. In this example, the CAS system 100 may be configured use the claim identifier 124 received from the terminal server 116 to retrieve the identification of the terminal server 116, stored in user session information 110, and compare the stored identification of the terminal server 108 to the received terminal server identification.

Returning to FIG. 2, the method may include notifying 216 the terminal server of authorization to initiate the session with the browser in response to verifying that the terminal server is authorized to initiate the session with the browser. For example, FIG. 1 illustrates the CAS system 100 may be configured to notify the terminal server 116 of the authorization to initiate the session with computing device 112. In accordance with embodiments, the method may include communicating a browser cookie to the terminal server indicating authentication for the terminal service session with the computing device. For example, CAS system 100 may be configured to communicate a browser cookie to terminal server 116 to authenticate the terminal server 116 to establish a terminal server session with computing device 112. In this example, the CAS system 100 may be configured to communicate the browser cookie to the TSS browser 134 of the terminal server 116 to authenticate the terminal server 116.

In accordance with embodiments of the present invention, the method may also include generating a session transfer key. For example, FIG. 1 illustrates the CAS system 100 may be configured to generate a session transfer key 130. In one embodiment, the session transfer key may comprise a short-lived token (SLT). The method may also include associating the session transfer key with the stored identification and session information. In accordance with embodiments, the CAS system 100 may be configured to randomly generate a number or value for the session transfer key. Other methods for generating or acquiring the session transfer key may be utilized by the CAS system 100 comprising, but not limited to, pre-assignment from a session transfer key database. As shown in FIG. 1, session transfer key 130 is associated with the user session information 110. In embodiments, the session transfer key may comprise a number or other value stored in the memory of the hosting computing device. The method may also include deleting the session transfer key after a predetermined period of time from the generation of the session transfer key. For example, the CAS system 100 may be configured to delete the session transfer key 130 after a predetermined period of time from the generation of the session transfer key 130.

In accordance with embodiments, the method may include receiving information from the second computing device for authenticating to the CAS system. For example, the CAS system 100 may be configured to receive information from computing device 112 for authenticating to the CAS system 100. The method may also include communicating a cookie to the second computing device in response to receiving the information. For example, the CAS system 100 may be configured to communicate a cookie to browser 114 of computing device 112 in response to receiving the authentication information.

The method may include determining that the terminal server is not authorized to initiate the session with the second computing device in accordance with embodiments. For example, the CAS system 100 may be configured to determine the terminal server 116 is not authorized to initiate the session with the computing device 112. Also in accordance with embodiments, the method may also include notifying the terminal server that the terminal server is not authorized to initiate the session with the second computing device. For example, the CAS system 100 may be configured to notify the terminal server 116 that the terminal server 116 is not authorized to initiate the session with computing device 112.

Figure 3:
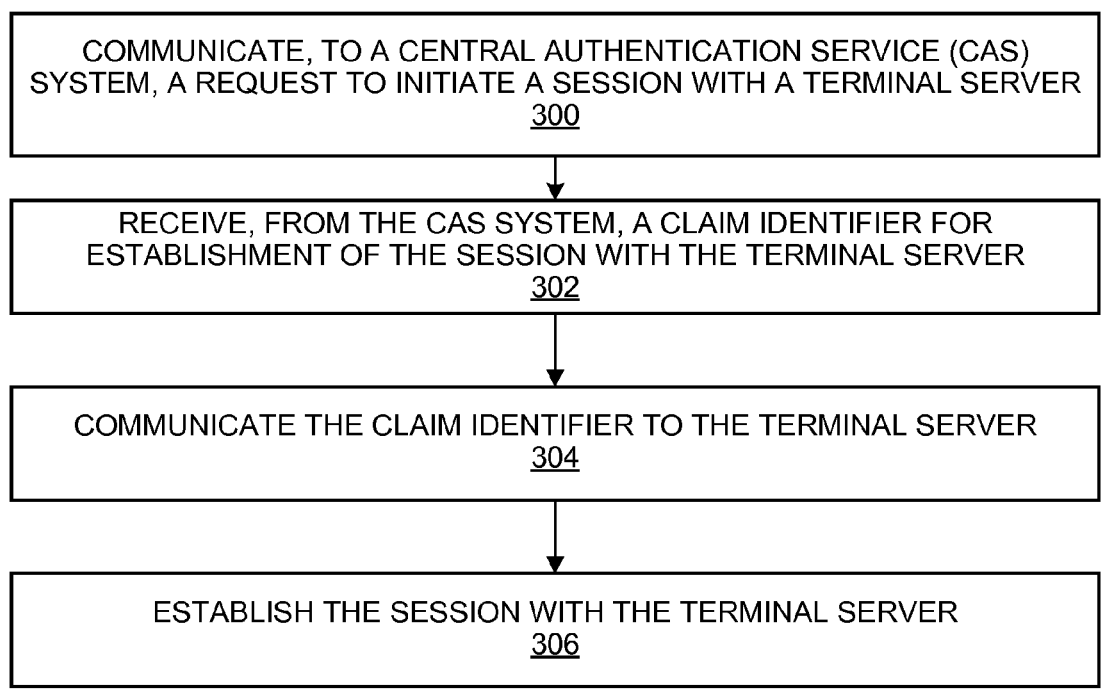
FIG. 3 is a flow chart of an example method for communicating, to a central authentication service (CAS) system, a request to initiate a session with a terminal server in accordance with embodiments of the present disclosure.

FIG. 3 illustrates an example method for communicating 300, to a central authentication service (CAS) system, a request to initiate a session with a terminal server at a first computing device. For example, FIG. 1 illustrates computing device 112 may be configured to communicate a TS SESSION REQ to the CAS system 100 to initiate a session with the terminal server 116. In accordance with embodiments, computing device 112 may be configured to enable a user of computing device 112 to communicate the TS SESSION REQ to the CAS system 100 using browser 114. In accordance with embodiments, the browser 114 may comprise an HTML compatible browser, or the like.

Returning to FIG. 3, the method may include receiving 302, from the CAS system, a claim identifier for establishment of the session with the terminal server. For example, FIG. 1 illustrates the computing device 112 may be configured to receive, from the CAS system 100, CLAIM ID 124 for establishment of the session with the terminal server 116. In accordance with embodiments, the claim identifier may be encrypted. For example, CLAIM ID 124 may be encrypted. Also in accordance with embodiments, the claim identifier may comprise an address of the CAS system. For example, the CLAIM ID 124 may comprise an address of the CAS system 100.

As shown in FIG. 3, the method may include communicating 304 the claim identifier to the terminal server. For example, the computing device 112 may be configured communicate the CLAIM ID 124 to the terminal server 116 to establish a session with the terminal server 116 via TSS Interface 126 of computing device 112. In accordance with embodiments, the terminal server session (TSS) interface 126 may comprise one of a local client, a control module, or control application installed in the browser 114. For example, the TSS Interface 126 may comprise a remote desktop protocol (RDP) client, where the RDP client uses the Remote Desktop Protocol. In this example, WEBRDP™ may be utilized as either a standalone client or an embedded client installed within the browser 114.

Remote Desktop Protocol (RDP) is a protocol developed by MICROSOFT™. In accordance with embodiments, the TSS interface 126 may provide a user of computing device 112 with a graphical user interface to establish a connection to another computing device, such as terminal server 116, over a network connection. Also in accordance with embodiments, the terminal server 116 may also comprise RDP server software. As an example, the TSS Interface 126 may exist for many versions of MICROSOFT WINDOWS® (including WINDOWS® Mobile), Linux™, Unix™, OS X™, iOS™, Android™, and other operating systems. As another example, terminal session server 116 may operate WINDOWS®, UNIX™, or OS X™ operating systems.

Returning to FIG. 3, the method includes establishing 306 the session with the terminal server. For example, computing device 112 may be configured to establish the session with terminal server 116 using TSS interface 126 of browser 114. In accordance with embodiments, establishing 306 the session may comprise initiating the session with a terminal service session (TSS) browser of the terminal server based on the claim identifier. For example, FIG. 1 illustrates the computing device 112 may be configured to initiate the session with the TSS browser 134 of the terminal server 116 based on the CLAIM ID 124.

In accordance with embodiments, the method includes receiving a session transfer key from the CAS system. For example, computing device 112 may be configured to receive a session transfer key from the CAS system 100 using browser 114. Also in accordance with embodiments, the method may include receiving, from the CAS system, a cookie including information that the browser is authenticated. For example, computing device 112 may receive, from CAS system 100, a cookie including information that browser 114 is authenticated with the CAS system 100.

Figure 4:
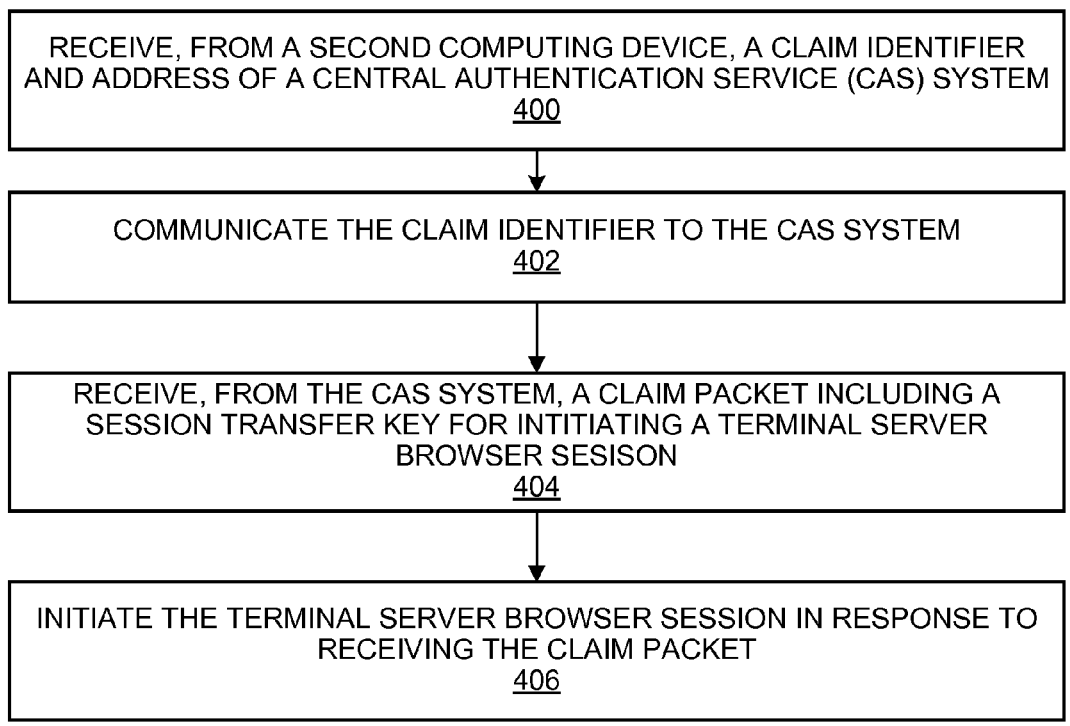
FIG. 4 is a flow chart of an example method for receiving, from a second computing device, a claim identifier and address of a central authentication service (CAS) system in accordance with embodiments of the present disclosure.

FIG. 4 illustrates an example method of receiving 400, from a second computing device, a claim identifier and an address of a central authentication service (CAS) system at a terminal server in accordance with embodiments of the present disclosure. For example, the terminal server 116 may be configured to receive, from computing device 112, CLAIM ID 124 and an address of CAS system 100. In accordance with embodiments, the terminal server 116 may be configured to receive the CLAIM ID 124 and address of the CAS system 100 during a terminal service session established with computing device 112 by terminal server-single sign on (TS-SSO) client 132. In accordance with embodiments, the TS-SSO client 132 may be configured to communicate with TSS Interface 126 to enable the user of computing device 112 to be authenticated via a single login. In this embodiment, the user of computing device 112 may gain access to remote servers without being asked for authentication credential again. In accordance with embodiments, the TS-SSO client 132 may be pre-installed and local client application to the terminal server 116. For example, the TS-SSO client 132 may comprise one of STONEWARE®'s WEBPASS™, WEBNETWORK™, and/or WNSSOCLIENT™.

In accordance with embodiments, the terminal server 116 may be configured to communicate the CLAIM ID 124 and the address of the CAS system 100 to the TS-SSO client 132. As mentioned previously, the claim identifier 118 and the address of the CAS 106 may be encrypted. In accordance to embodiments, the method may include decrypting the claim identifier. For example, the TS-SSO client 132 may be configured to decrypt the encrypted CLAIM ID 124 and address of the CAS system 100.

Returning to FIG. 4, the method includes communicating 402 the claim identifier to the CAS system. For example, the terminal server 116 may be configured to communicate the CLAIM ID 124 to the CAS system 100. The method also includes receiving 404, from the CAS system, a claim packet including a session transfer key for initiating a terminal server browser session. In accordance with embodiments, and mentioned previously, the session transfer key may comprise a short-lived token. For example, as shown in FIG. 1, the terminal server 116 may be configured to receive, from CAS system 100, CLAIM PACKET 128 including session transfer key 130 for initiating the terminal server browser session. In accordance with embodiments, the claim packet may comprise an indication of the type of browser to launch as the terminal session browser.

The method of FIG. 4 includes initiating the terminal server browser session in response to receiving the claim packet. For example, terminal server 116 may be configured to initiate the terminal server browser session with the CAS system 100 in response to receiving CLAIM PACKET 128. In accordance with embodiments, the method may include communicating the session transfer key to the CAS system for verification that the terminal server session is launched on the expected computing device. For example, terminal server 116 may configured to communicate the session transfer key 130 received in CLAIM PACKET 128 to the CAS system 100 for the CAS system to verify terminal server 116 is authorized to launch the terminal server session. Also in accordance with embodiments, the method may include receiving a browser cookie, from the CAS system, indicating the terminal server browser session is authenticated. For example, terminal server 116 may be configured to receive a browser cookie, from the CAS system 100, via the TSS Browser 134 to indicate the terminal browser session is authenticated.

Figure 5:
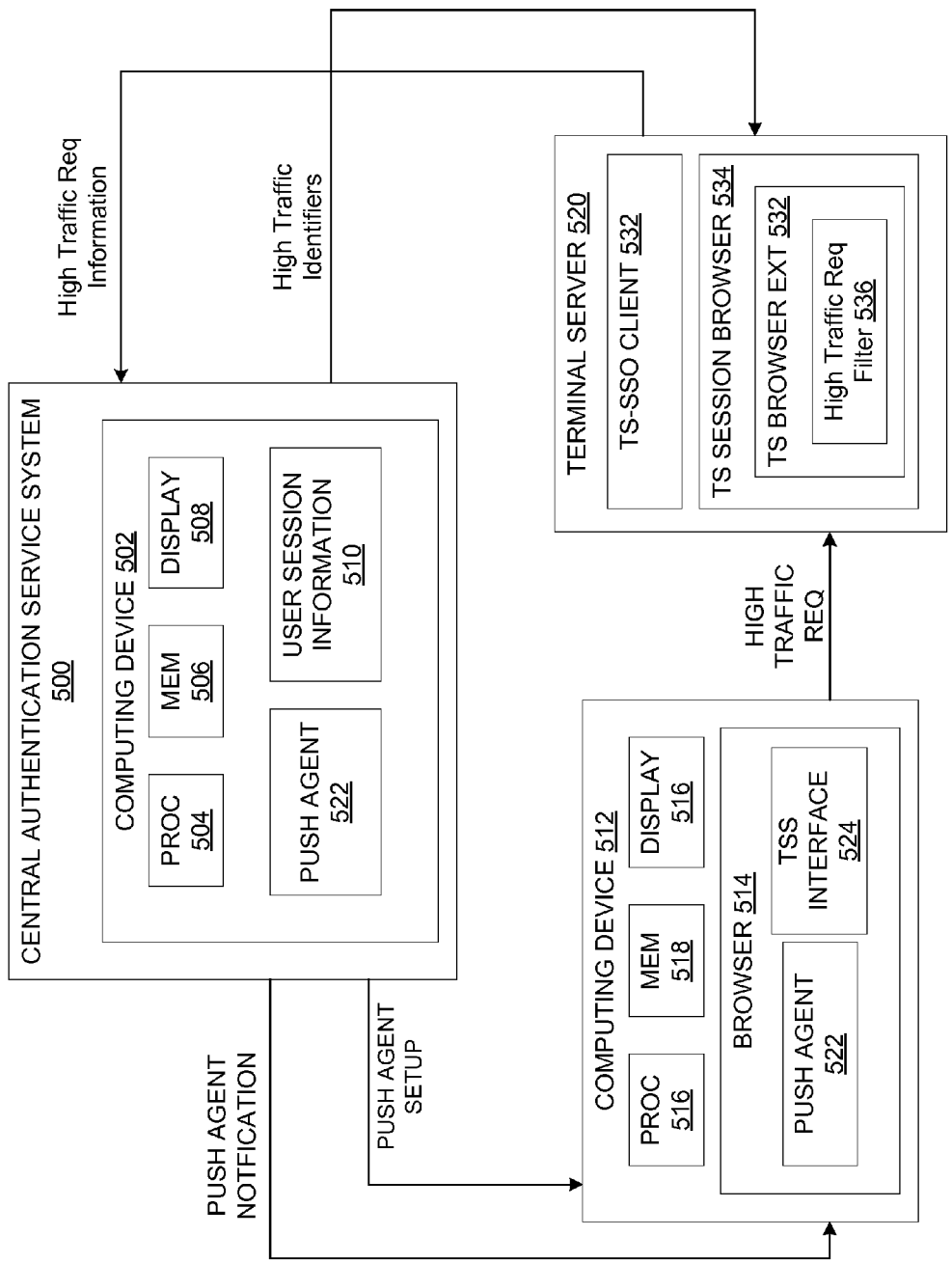
FIG. 5 is a block diagram of an example system for of communicating high traffic identifiers to a terminal server for filtering high traffic data requests from a computing device in a terminal service session with the terminal server in accordance with embodiments of the present disclosure.
Figure 6:
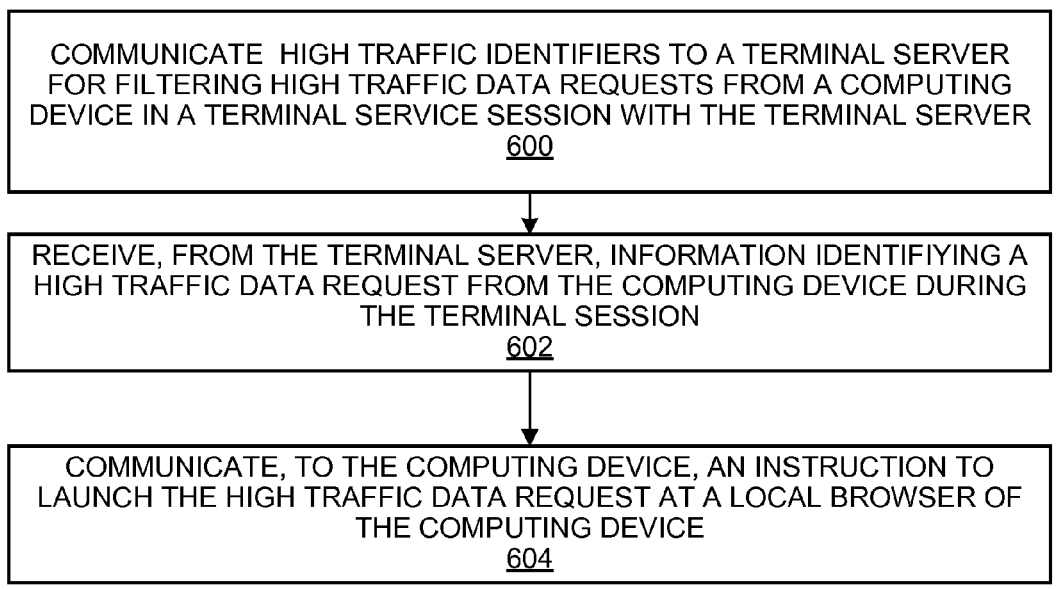
FIG. 6 is a flow chart of an example method of communicating high traffic identifiers to a terminal server for filtering high traffic data requests from a computing device in a terminal service session with the terminal server in accordance with embodiments of the present disclosure; in accordance with embodiments of the present disclosure.

High traffic data, such as, but not limited to, media rich content, like video or multi-media applications are demanding on the CAS system's resources. High traffic data may also be demanding to a terminal server and its associated terminal services client. For example, a CAS system and/or a terminal server may not possess the resources to handle a terminal service session and video with high framerates. Bandwidth usage may be increased due to the general large size of media rich content, thus high traffic data may occur during terminal service sessions. Offloading the high traffic data to a local browser of the user's computing device, may reduce the burden on the CAS system's and the terminal server's resources. FIGS. 5 and 6 illustrates an example system and method for communicating 600 high traffic identifiers to a terminal server for filtering high traffic data requests from a computing device in a terminal service session with the terminal server in accordance with embodiments of the present disclosure. FIG. 5 illustrates the CAS system 500 may be configured to communicate high traffic identifiers to terminal server 520 for filtering high traffic data request from computing device 112 in a terminal service session with terminal server 520. In accordance with embodiments, the high traffic identifiers may identify a list of known web pages comprising or providing access to high traffic data.

FIG. 6 illustrates the method may include receiving 602, from the terminal server, information identifying a high traffic data request from the computing device during the terminal session. For example, FIG. 5 depicts that the CAS system 500 may be configured to receive from terminal server 520 information comprising a HIGH TRAFFIC REQ received by the terminal server 520 from computing device 512. The method may include, as shown in FIG. 6, communicating 604, to the computing device, an instruction to launch the high traffic data request at a local browser of the computing device. For example, the CAS system 500 may be configured communicate an instruction to launch the high traffic data request at a local browser of computing device 512 using push agent 522. In accordance with embodiments, push agent 522 may comprise one of a JAVASCRIPT™ framework, a COMET™ framework, or other frameworks utilizing AJAX™ to simulate server pushes, and the like.

Figure 7:
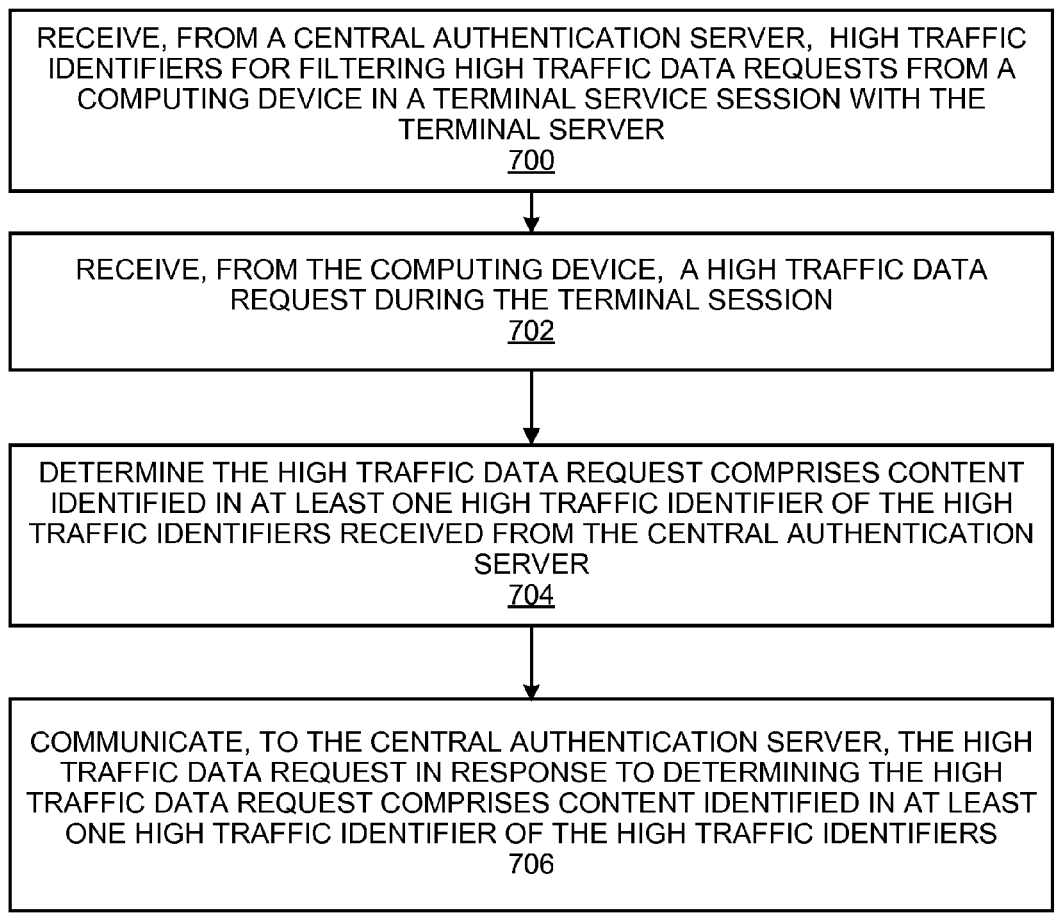
FIG. 7 is a flow chart of an example method of receiving a high traffic data request during a terminal session in accordance with embodiments of the present disclosure.

FIG. 7 illustrates a method for receiving 700, from a central authentication server, high traffic identifiers for filtering high traffic data requests from a computing device in a terminal service session with the terminal server. For example, FIG. 5 illustrates terminal server 520 may be configured to receive, from CAS system 500, HIGH TRAFFIC IDENTIFIERS for filtering high traffic data requests from computing device 512 in a terminal service session with terminal server 520. In accordance with embodiments, the terminal server 520 may be configured to store the received HIGH TRAFFIC IDENTIFIERS in High Traffic Request Filter 536 of TS Browser Extension 532. In accordance with embodiments, the TS Browser Extension 532 may comprise an extension in a Chrome™ browser. Also in accordance with embodiments, the TS Browser Extension 532 may comprise one of a Browser Helper Object in an Internet Explorer™ browser and an Add-On in a FIREFOX™ browser. It is noted that any browser may be configured with a browser extension, or equivalent thereof, to perform the features of present disclosure.

Returning to FIG. 7, the method may include receiving 702, from the computing device, a high traffic data request during the terminal session. For example, terminal server 520 may receive, from computing device 512, a HIGH TRAFFIC REQ during the terminal session between TS Session Browser 534 and browser 514. FIG. 7 also illustrates the method may include determining 704 the high traffic data request comprises content identified in at least one high traffic identifier of the high traffic identifiers received from the central authentication server. For example, terminal server 520 may be configured to determine the HIGH TRAFFIC REQ comprises content identified in at least one of the high traffic identifier of the high traffic identifiers stored in High Traffic Req Filter 536. In accordance with embodiments, the high traffic data request may comprise a request to access a web page comprising high traffic data content. As shown in FIG. 7, the method may include communicating 706, to the central authentication server, the high traffic data request in response to determining the high traffic data request comprises content identified in at least one high traffic identifier of the high traffic identifiers. For example, FIG. 5 illustrates the terminal server 520 may be configured to communicate, to the CAS system 500, the HIGH TRAFFIC REQ information in response to determining the HIGH TRAFFIC REQ comprises content identified in at least one high traffic identifier of the high traffic identifiers stored in High Traffic Req Filter 536.

Figure 8:
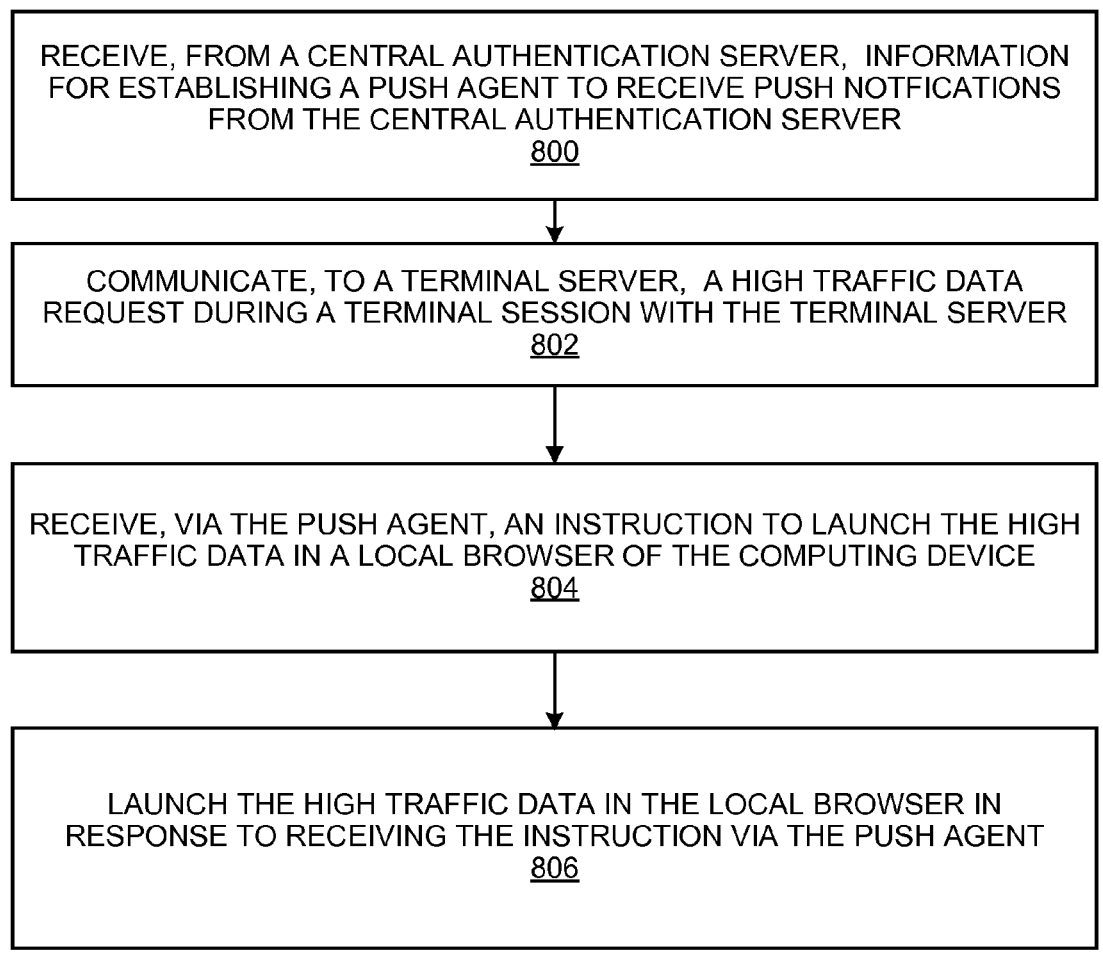
FIG. 8 is a flow chart of an example method of receiving, via a push agent, an instruction to launch high traffic data in a local browser of a computing device in a terminal service session in accordance with embodiments of the present disclosure.

FIG. 8 illustrates an example method for receiving 800, from a central authentication server, information for establishing a push agent to receive push notifications from the central authentication server. For example, FIG. 5 illustrates that computing device 512 may be configured to receiving, from CAS system 500, PUSH AGENT SETUP information for establishing push agent 522 in browser 514 to receive PUSH AGENT NOTIFICATION from the CAS system 500. In accordance with embodiments, the push notifications received from the central authentication server may comprise instructions to launch a high traffic request in a local browser of the computing device.

As shown in FIG. 8, the method includes communicating 802, to a terminal server, a high traffic data request during a terminal session with the terminal server. For example, FIG. 5 illustrates computing device 512 may be configured to communicate, to terminal server 520, HIGH TRAFFIC REQ during a terminal session with terminal server 520. In accordance with embodiments, computing device 512 may be configured communicate the HIGH TRAFFIC REQ via TSS Interface 524 to TS Session Browser 534. FIG. 8 also illustrates the method may include receiving 804, via the push agent, an instruction to launch the high traffic data in a local browser of the computing device. For example, FIG. 5 depicts that computing device 512 may be configured to receive, via Push Agent 522, PUSH AGENT NOTIFICATION comprising an instruction to launch the high traffic data in a local browser of computing device 512.

Returning to FIG. 8, the method may include launching 806 the high traffic data in the local browser in response to receiving the instruction via the push agent. For example, computing device 512 may launch the high traffic data in a local browser of computing device 512 in response to receiving the PUSH AGENT NOTIFICATION via Push Agent 522. In this manner, offloading high traffic data content in a terminal service session is accomplished to avoid performance reduction during the terminal service session.

Figure 9:
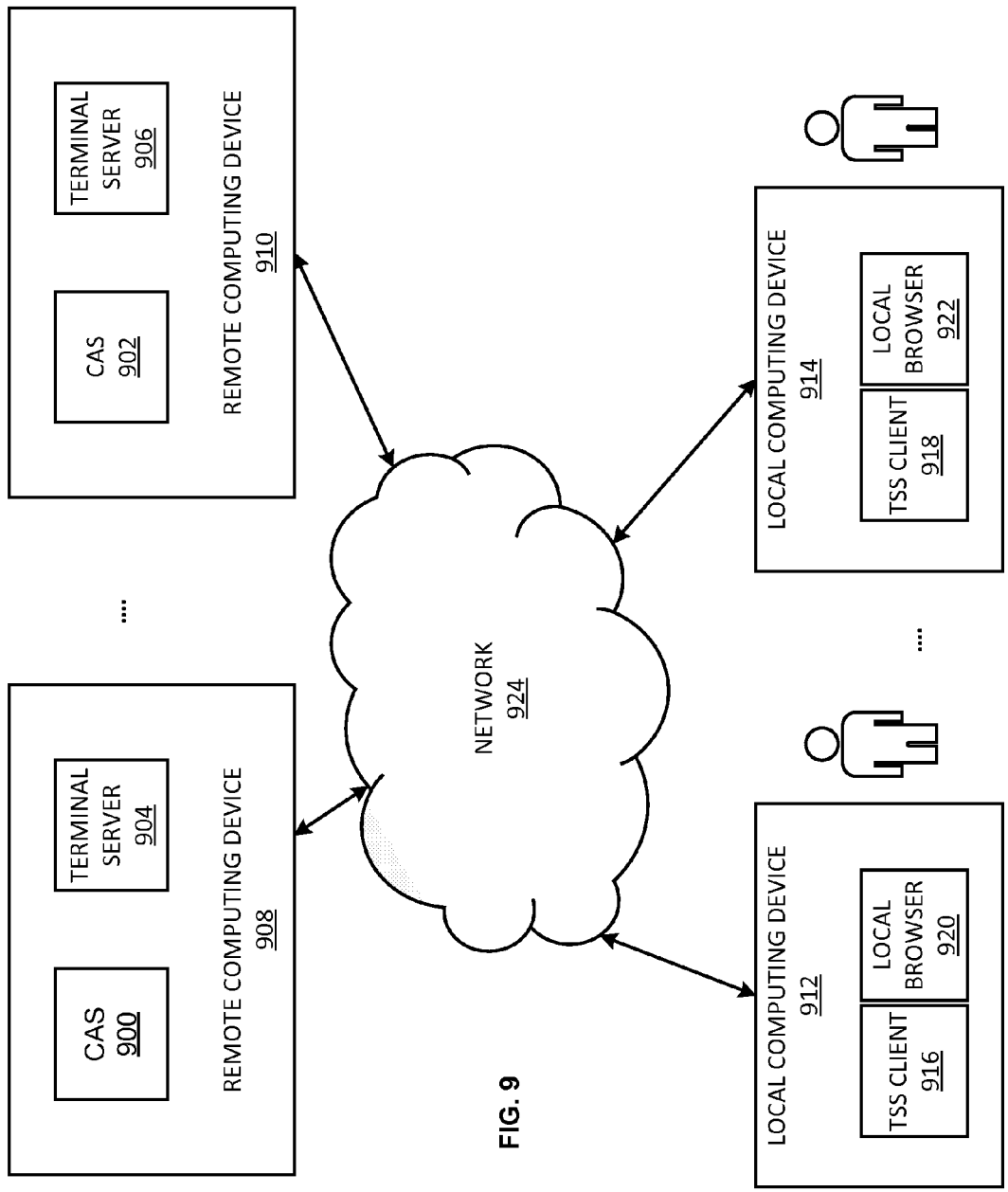
FIG. 9 is a block diagram of an example central authentication network in accordance with embodiments of the present disclosure.

FIG. 9 illustrate a block diagram of an example central authentication network in accordance with embodiments of the present disclosure. The methods as described herein may be executed on CAS systems 900 and 902 and terminal servers 904 and 906 located on remote computing devices 908 and 910 respectively. The remote computing devices 908 and 910 may include various displays, size of memory and number of processors. In accordance with embodiments, CAS systems 908 and 910 and the terminal servers 904 and 906 may be launched on different remote computing devices 908 and 910 or the same remote computing device(s) 908 and 910. FIG. 9 illustrates each remote computing device 908 and 910 as hosting a CAS system 900 and 902 and terminal servers 904 and 906 respectively, however, each remote computing device 908 and 910 may host more than one CAS 900 and 902 and/or more than one terminal server 904 and 906 as desired.

FIG. 9 illustrates remote computing devices 908 and 910 may be configured to be communicatively connected to a network 924. In accordance with embodiments, the connection may be a wired or wireless connection and is not limited in size, number of connected computing devices and the like. FIG. 9 also illustrates the system may also include the local computing devices 912 and 914 for hosting the local browsers 920 and 922 and the TSS clients 916 and 918 respectively. FIG. 9 also illustrates the local computing devices 912 and 914 are connected to the network 924 in order to communicate with remote computing devices 908 and 910. As described above with respect to the remote computing device(s) 908 and 910, the local computing devices 912 and 914 may include various displays, size of memory and number of processors. Also similar to the remote computing device(s) 908 and 910 described above, the local computing device(s) 912 and 914 may host the TSS clients 916 and 918 on the same local computing device(s) 912 and 914 or on remote computing devices 908 and 910 connected to the network 924. In accordance with embodiments, the TSS clients 916 and 918 may initiate and establish a session with any of the CAS 900 and 902 or terminal server 904 and 906 sessions on any of the remote computing devices 908 and 910 connected to the network 924.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flow chart illustrations and/or block diagrams of methods, apparatus (systems), and computer program products according to embodiments of the present disclosure. It will be understood that each block of the flow chart illustrations and/or block diagrams, and combinations of blocks in the flow chart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow chart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flow chart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flow chart and/or block diagram block or blocks.

The flow chart and block diagrams in the Figures illustrate the architecture, functionality, and operation of possible implementations of systems, methods, and computer program products according to various embodiments of the present disclosure. In this regard, each block in the flow chart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow chart illustration, and combinations of blocks in the block diagrams and/or flow chart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
 at a first computing device of a central authentication service (CAS) system:
  receiving, from a browser of a second computing device, a request to initiate a terminal server session with a terminal server;
  storing identification of the terminal server and session information;
  associating a claim identifier with the stored identification and session information;
  communicating the claim identifier to the second computing device;
  receiving the claim identifier from the terminal server;
  using the claim identifier received from the terminal server to verify that the terminal server is authorized to initiate the terminal server session with the second computing device;
  in response to verifying that the terminal server is authorized to initiate the session with the second computing device,
  initiating the terminal server session with the second computing device;

receiving information for establishing a push agent to receive push notifications;

communicating, to the terminal server, a high traffic data request during the terminal server session with the terminal server;

receiving, via the push agent, instructions to launch the high traffic data in a local browser of the first computing device; and launching the high traffic data in the browser in response to receiving the instructions via the push agent.

2. The method of claim 1, further comprising:

generating a session transfer key;

associating the session transfer key with the stored identification and session information; and deleting the session transfer key after a predetermined period of time from the generation of the session transfer key.

3. The method of claim 1, wherein the session information comprises an Internet Protocol (IP) address of the terminal server and identification of a session launch information.

4. The method of claim 1, further comprising encrypting the claim identifier, and wherein communicating the claim identifier comprises communicating the encrypted claim identifier to the second computing device.

5. The method of claim 1, further comprising:

receiving information from the second computing device for authenticating to the CAS system; and in response to receiving the information, communicating a cookie to the second computing device.

6. The method of claim 1, further comprising receiving, from the second computing device, selection of a web browser for the session.

7. The method of claim 1, further comprising:

determining that the terminal server is not authorized to initiate the session with the second computing device; and in response to determining that the terminal server is not authorized, notifying the terminal server that the terminal server is not authorized to initiate the session with the second computing device.

8. A method comprising:

at a first computing device including a browser:

communicating, to a central authentication service (CAS) system, a request to initiate a terminal server session with a terminal server;

receiving, from the CAS system, a claim identifier for establishment of the terminal server session with the terminal server;

communicating the claim identifier to the terminal server;

initiating the terminal server session with the terminal server;

receiving, from the CAS system, information for establishing a push agent to receive push notifications from the CAS system;

communicating, to the terminal server, a high traffic data request during the terminal server session with the terminal server;

receiving, via the push agent, instructions to launch the high traffic data in a browser of the first computing device; and launching the high traffic data in the browser in response to receiving the instructions via the push agent.

9. The method of claim 8, wherein the claim identifier is encrypted.

10. The method of claim 8, wherein the claim identifier identifies an address of the CAS system.

11. The method of claim 8, wherein establishing the session comprises initiating a terminal server session browser at the terminal server based on the received claim identifier.

12. The method of claim 8, further comprising receiving a session transfer key from the CAS system.

13. The method of claim 8, further comprising receiving, from the CAS system, a cookie indicating that the browser is authenticated.

14. The method of claim 8, wherein the browser is a hypertext markup language (HTML) compatible browser.

15. A method comprising:

at a first computing device that manages a terminal server session:

receiving, from a second computing device, a claim identifier and address of a central authentication service (CAS) system;

communicating the claim identifier to the CAS system;

receiving, from the CAS system, a claim packet including a session transfer key for initiating a terminal server browser session;

in response to receiving the claim packet, initiating the terminal server browser session;

receiving, from the CAS system, high traffic identifiers for filtering high traffic data requests from the second computing device in the terminal service session with the first computing device;

receiving, from the second computing device, a high traffic data request during the terminal server browser session;

determining the high traffic data request comprises content identified in at least one high traffic identifier of the high traffic identifiers received from the central authentication server; and communicating, to the central authentication server, the high traffic data request in response to determining the high traffic data request comprises content identified in at least one high traffic identifier the high traffic identifiers.

16. The method of claim 15, wherein the claim identifier received from the second computing device is encrypted, wherein the method further comprises, at the first computing device, decrypting the claim identifier, and wherein communicating the claim identifier to the CAS system comprises communicating the decrypted claim identifier to the CAS system.

17. The method of claim 16, further comprising:

communicating the session transfer key to the CAS system; and receiving a browser cookie, from the CAS system, indicating the terminal server browser session is authenticated.

* * * * *